United States Patent
Won et al.

(10) Patent No.: US 11,153,288 B2
(45) Date of Patent: Oct. 19, 2021

(54) SYSTEM AND METHOD FOR MONITORING LEAKAGE OF INTERNAL INFORMATION BY ANALYZING ENCRYPTED TRAFFIC

(71) Applicant: THE INDUSTRY & ACADEMIC COOPERATION IN CHUNGNAM NATIONAL UNIVERSITY (IAC), Daejeon (KR)

(72) Inventors: Yoo Jae Won, Seongnam-si (KR); Ji Hoon Yoon, Daejeon (KR)

(73) Assignee: THE INDUSTRY & ACADEMIC COOPERATION IN CHUNGNAM NATIONAL UNIVERSITY (IAC), Daejeon (KR)

( * ) Notice: Subject to any disclaimer, the term of this patent is extended or adjusted under 35 U.S.C. 154(b) by 73 days.

(21) Appl. No.: 16/463,969

(22) PCT Filed: Nov. 17, 2017

(86) PCT No.: PCT/KR2017/013101
§ 371 (c)(1),
(2) Date: May 24, 2019

(87) PCT Pub. No.: WO2018/097548
PCT Pub. Date: May 31, 2018

(65) Prior Publication Data
US 2019/0394178 A1    Dec. 26, 2019

(30) Foreign Application Priority Data
Nov. 25, 2016  (KR) .......................... 10-2016-0158228

(51) Int. Cl.
*H04L 29/06*    (2006.01)
*H04L 9/32*    (2006.01)

(52) U.S. Cl.
CPC ........ *H04L 63/0464* (2013.01); *H04L 9/3268* (2013.01); *H04L 63/1408* (2013.01); *H04L 63/166* (2013.01)

(58) Field of Classification Search
CPC . H04L 9/0841; H04L 9/3268; H04L 63/4708; H04L 63/0823; H04L 63/166; H04L 63/0464
(Continued)

(56) References Cited

U.S. PATENT DOCUMENTS 8,782,393 B1    7/2014  Rothstein et al.
2003/0018891 A1  1/2003  Hall et al.
(Continued)

FOREIGN PATENT DOCUMENTS

| KR | 10-0671044 B1 | 1/2007 |
| KR | 10-2013-0024388 A | 3/2013 |
| KR | 10-1275708 B1 | 6/2013 |

OTHER PUBLICATIONS

Won, Yoo Jae et al., "A Study on Mechanism for SSL Traffic Inspection in an Enterprise Environment", Korea Information Processing Society, The KIPS Fall Conference 2016, Pusan National University, 2016, with English abstract 11 pages.
(Continued)

*Primary Examiner* — Benjamin A Kaplan
(74) *Attorney, Agent, or Firm* — Rothwell, Figg, Ernst & Manbeck, P.C.

(57) ABSTRACT

A system and method for monitoring a leakage of internal information by analyzing encrypted traffic according to the present invention is characterized in that an SSL session is not created directly between an internal computer and an external computer, but a monitoring computer creates SSL sessions with the internal computer and the external computer respectively, and when a data packet is transmitted
(Continued)

from the internal computer to the external computer, the monitoring computer first checks whether the data packet contains internal information and then delivers the data packet.

10 Claims, 3 Drawing Sheets

(58) Field of Classification Search
 USPC .......................................................... 713/156
 See application file for complete search history.

(56) References Cited

U.S. PATENT DOCUMENTS

| | | | |
|---|---|---|---|
| 2006/0209789 A1* | 9/2006 | Gupta | H04L 63/1425 370/352 |
| 2011/0283101 A1 | 11/2011 | Kolton et al. | |
| 2013/0097309 A1* | 4/2013 | Ma | H04L 67/2847 709/224 |
| 2015/0054947 A1* | 2/2015 | Dawes | H04N 7/181 348/143 |
| 2016/0173488 A1 | 6/2016 | Xie et al. | |
| 2018/0295134 A1* | 10/2018 | Gupta | H04L 67/28 |
| 2019/0140834 A1* | 5/2019 | Medvinsky | H04L 9/3242 |
| 2020/0136838 A1* | 4/2020 | Kucharski | H04L 9/3268 |

OTHER PUBLICATIONS

Won, Yoo Jae et al., "A Study on Mechanism for SSL Traffic Inspection in an Enterprise Environment", Korea Information Processing Society, The KIPS Fall Conference 2016, Pusan National University, 2016, 10 pages.

International Search Report issued for International Application No. PCT/KR2017013101 dated Feb. 9, 2018, 4 pages.

* cited by examiner

SYSTEM AND METHOD FOR MONITORING LEAKAGE OF INTERNAL INFORMATION BY ANALYZING ENCRYPTED TRAFFIC

CROSS-REFERENCE TO RELATED APPLICATIONS

The application is a 35 U.S.C. § 371 National Phase Entry Application from PCT/KR2017/013101, filed on Nov. 17, 2017, which claims the benefit of Korean Patent Application No. 10-2016-0158228 filed on Nov. 25, 2016, the disclosures of which are incorporated herein in their entirety by reference.

TECHNICAL FIELD

The present disclosure relates to a system and a method for monitoring leakage of internal information by analyzing encrypted traffic, and more particularly, to a system and a method for monitoring leakage of internal information by checking whether or not an encrypted data packet transmitted from an internal computer to an external computer contains internal confidential information.

BACKGROUND ART

These days, companies are prioritizing monitoring for leakage of internal information over the Internet.

Patent Document 1 {KR 10-1275708 B1 (registered on 11 Jun. 2013)} relates to technology for an information leakage prevention system and a method for selectively blocking HTTPS connection using information of an SSL/TLS handshaking packet, which is one of technologies for monitoring the leakage of internal information over the Internet.

However, according to the monitoring method of Patent Document 1, it is possible only to identify whether or not data is transmitted to the URL that is the target to be blocked, whereas it is impossible to identify whether or not the transmitted data contains internal information. This is due to the fact that HTTPS communication is performed by creating an SSL session and transmitting/receiving encrypted data.

In order to effectively monitor the leakage of internal information, a technique capable of identifying the content of the transmitted data even when the internal computer creates an SSL session with the external computer and transmits/receives encrypted data thereto/from is required.

DETAILED DESCRIPTION OF THE INVENTION

Technical Problem

An aspect of the present disclosure is to provide a system and a method for monitoring the leakage of internal information through the analysis of encrypted traffic, which is capable of identifying the content of data even when the internal computer transmits data to the external computer through an SSL session, thereby effectively monitoring for the leakage of internal information.

Technical Solution

A system for monitoring leakage of internal information according to the present disclosure is characterized by including: an internal computer; a monitoring computer; and an external computer, wherein the monitoring computer is configured to: make a request for an SSL session to the external computer after receiving an SSL session creation request from the internal computer; create an SSL session between the monitoring computer and the external computer upon receiving a response thereto; transmit a response to the SSL session creation request to the internal computer to thus create an SSL session between the monitoring computer and the internal computer; and when transmitting a packet from the internal computer to the external computer, check whether or not the packet contains internal information and transmit the same.

The system for monitoring leakage of internal information may create the SSL session between the monitoring computer and the external computer using an original certificate transmitted from the external computer, and may create the SSL session between the monitoring computer and the internal computer using a monitoring-computer-modified certificate obtained through modification of the original certificate by the monitoring computer, and when the monitoring computer checks whether or not the packet contains internal information and then transmits the same, the monitoring computer may decrypt the packet using a session key related to the monitoring-computer-modified certificate, may check whether or not the packet contains internal information, may then encrypt the decrypted packet using a session key related to the original certificate, and may transmit the same to the external computer.

The monitoring computer may include a network interface, an ARP spoofing module, an SSL traffic decryption/encryption module, and an SSL session information DB, wherein the network interface enables the monitoring computer to transmit/receive data to/from the internal computer and the external computer, wherein the ARP spoofing module changes the route of the packet so as to pass through the monitoring computer, wherein the SSL session information DB stores a session key related to the monitoring-computer-modified certificate and a public key related to the original certificate, and wherein the packet transmitted by the internal computer is decrypted using a session key related to the monitoring-computer-modified certificate, and then the decrypted packet is encrypted using a session key related to the original certificate.

When transmitting a packet from the external computer to the internal computer, the system for monitoring leakage of internal information may check whether or not the packet contains code for leakage of internal information, and may then transmit the packet.

A method for monitoring leakage of internal information according to the present disclosure may be a method for monitoring leakage of internal information through analysis of encrypted traffic using a system for monitoring leakage of internal information, which includes an internal computer, a monitoring computer, and an external computer, the method including; a first step in which the monitoring computer receives an SSL session creation request from the internal computer; a second step in which, in order to create a new SSL session between the external computer and the monitoring computer, the monitoring computer makes a request for an SSL session to the external computer and receives a response thereto; a third step of creating an SSL session between the monitoring computer and the external computer and then transmitting a response to the SSL session creation request to the internal computer; a fourth step of creating an SSL session between the monitoring computer and the internal computer; and a fifth step of transmitting a packet from the internal computer to the external computer after the monitoring computer checks whether or not the packet contains internal information.

The method for monitoring leakage of internal information may further include: creating an SSL session between the monitoring computer and the external computer using an original certificate transmitted from the external computer; and creating an SSL session between the monitoring computer and the internal computer using a monitoring-computer-modified certificate obtained through modification of the original certificate by the monitoring computer, wherein, in the fifth step, the monitoring computer decrypts the packet using a session key related to the monitoring-computer-modified certificate, then checks whether or not the packet contains internal information, then encrypts the decrypted packet using a session key related to the original certificate, and finally transmits the same to the external computer.

Advantageous Effects

A system and a method for monitoring leakage of internal information according to the present disclosure is capable of identifying the content of data even when an internal computer transmits data to an external computer through an SSL session, thereby effectively monitoring the leakage of internal information.

MODE FOR CARRYING OUT THE INVENTION

Figure 1:
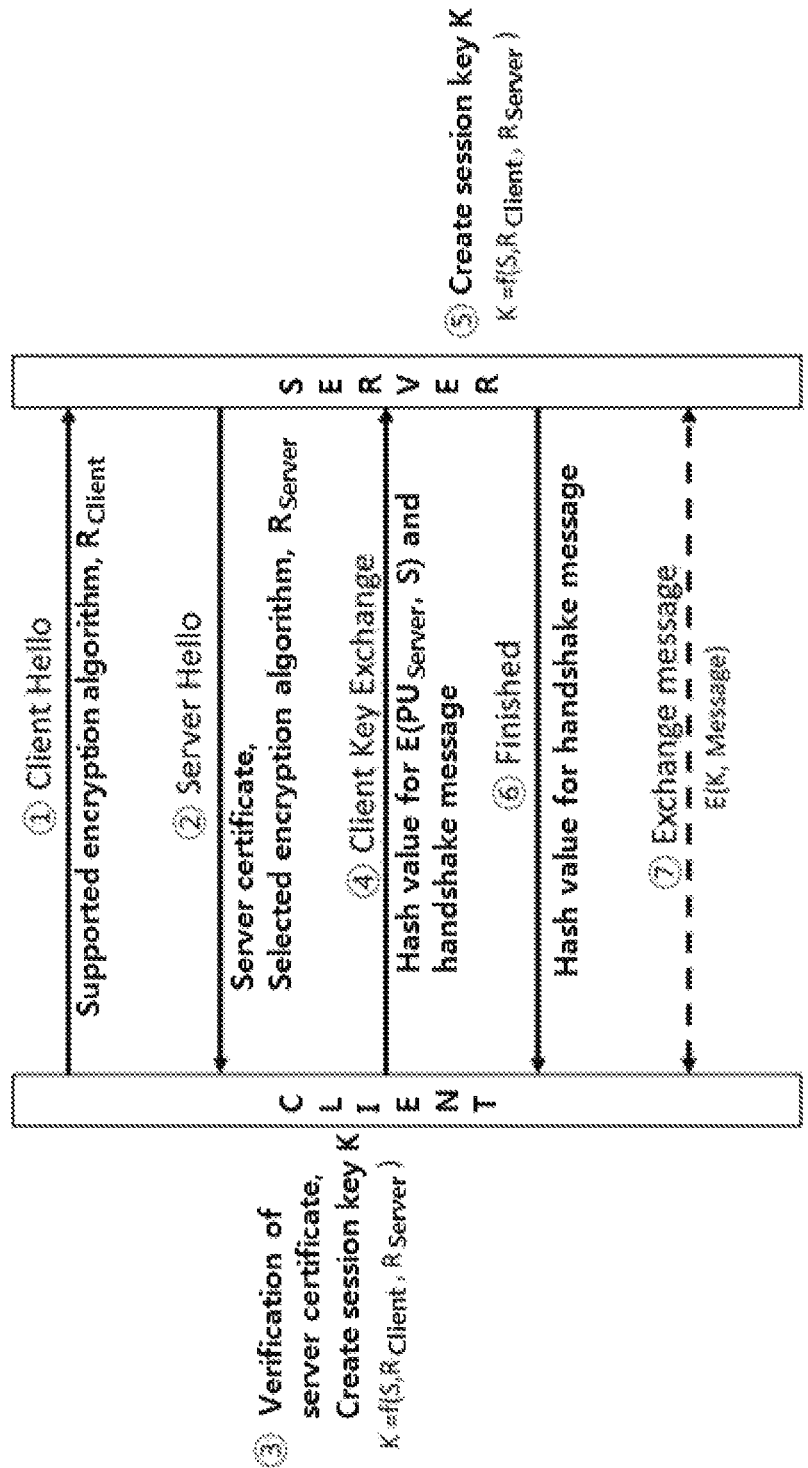
FIG. 1 is a diagram illustrating an SSL handshake process.

While the present disclosure may be subject to various modifications and embodiments, specific embodiments thereof will be described in detail by way of examples in the drawings. It should be understood, however, that the disclosure is not intended to be limited to particular embodiments but includes all modifications, equivalents, and alternatives falling within the spirit and scope of the disclosure. In the description of the disclosure, a detailed description of well-known technology in relation to the present disclosure, which may obscure the subject matter of the present disclosure, will be omitted.

The terminologies used in this specification are intended to facilitate explanation of a specific embodiment, but are not intended to limit the disclosure. Singular expressions include plural expressions unless clearly stated otherwise.

Hereinafter, the present disclosure will be described in more detail with reference to the accompanying drawings.

SSL (Secure Sockets Layer) is a security protocol that provides data encryption and authentication functions in the transport layer, and performs an SSL handshake process to exchange information necessary for encrypted communication. The secret value necessary for creation of a session key is transmitted using a public key algorithm during the SSL handshake process, which makes it difficult to acquire the session key of the third party.

FIG. 1 is a diagram illustrating an SSL handshake process.
In FIG. 1, R denotes a random value, K denotes a session key, S denotes a secret, PU denotes a public key, and E denotes an encryption function.

The SSL handshake process in FIG. 1 is as follows.

(1) Client Hello
A client transmits a supported encryption algorithm and a random value of the client to a server.

(2) Server Hello
The server transmits a server certificate, the selected encryption algorithm, and a random value of the server to the client.

(3) Server Certificate Verification and Session Key Creation of Client
The client verifies the server certificate and creates a session key of the client using the random value of the client, the random value of the server, and the secret.

(4) Client Key Exchange
The client transmits, to the server, a hash value for the encrypted secret and a handshake message.

At this time, the secret is encrypted by the encryption function selected through Server Hello, and the public key of the server is used for the encryption (the secret encrypted with the public key of the server can only be decrypted with a private key that is possessed only by the server).

(5) Session Key Creation of Server
A session key of the server is created using the random value of the client, the random value of the server, and the secret.

(6) Finished (Termination of Handshake)
The server transmits a hash value for the handshake message to the client.

(7) Exchange Message
An encrypted message is exchanged using a session key, and is decrypted using the session key.

Since all of the public key, the private key, the session key, and the server certificate used for SSL session creation and message exchange are used for the same SSL session creation and message exchange, they may be expressed as being related to each other.

Figure 2:
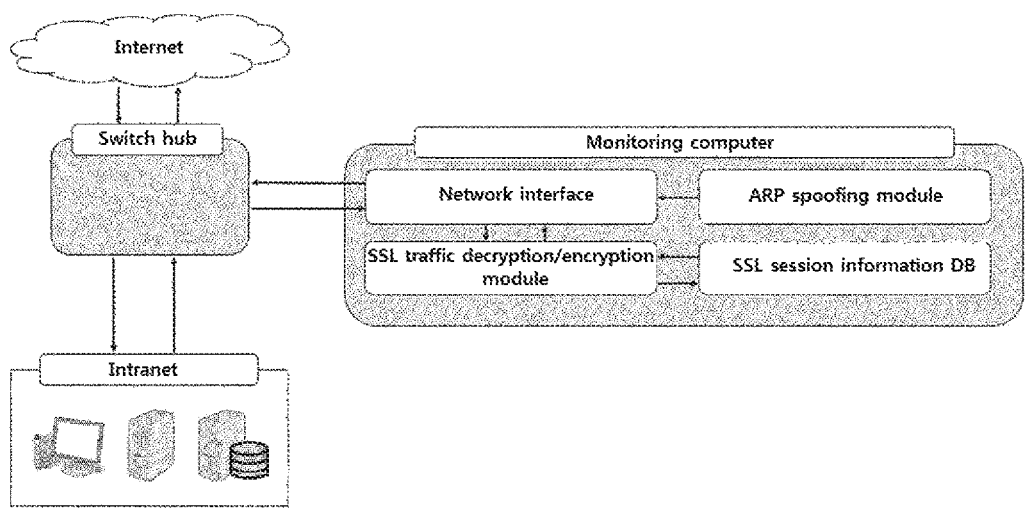
FIG. 2 is a diagram illustrating the configuration of a monitoring computer according to the present disclosure.

FIG. 2 is a diagram illustrating the configuration of a monitoring computer according to the present disclosure.

The monitoring computer in FIG. 2 includes a network interface, an ARP spoofing module, an SSL traffic decryption/encryption module, and an SSL session information DB.

The network interface plays the role of connecting the monitoring computer to the intranet of a company and the Internet.

The ARP spoofing module allows the monitoring computer to perform ARP spoofing.

The ARP spoofing function changes the flow of traffic to and from the company so as to pass through the monitoring computer and enables the monitoring computer to analyze encrypted traffic.

The SSL session information DB plays the role of storing information (a public key, a session key, etc.) related to the SSL session connection of the monitoring computer.

The SSL traffic decryption/encryption module plays the role of decrypting a message transmitted by the internal computer and re-encrypting the message prior to being transmitted to the external computer.

FIGS. 3(A)-3(D) illustrate an SSL session creation process according to the present disclosure.

An internal computer in FIGS. 3(A)-3(D) transmits a packet (data packet) to an external computer. A monitoring computer located therebetween creates an SSL session with the internal computer and the external computer, receives a data packet from the internal computer to thus transmit the same to the external computer, and receives a data packet from the external computer to thus transmit the same to the internal computer.

The internal computer and the external computer in FIGS. 3(A)-3(D) denote a computer inside the company and a computer outside the company. The internal computer in FIGS. 3(A)-3(D) makes a request for SSL session creation for data transmission to the external computer, so that the internal computer and the external computer in FIGS. 3(A)-3(D) correspond to the client and the server in FIG. 1, respectively.

Figure 3:
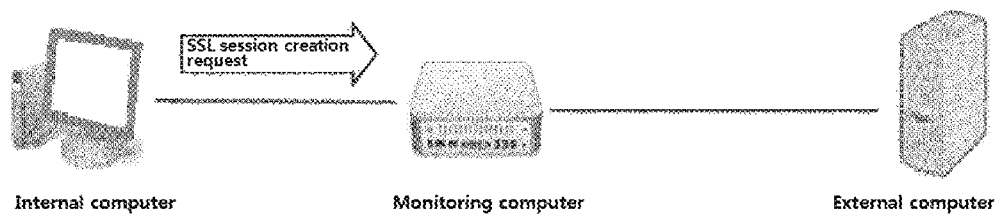
FIGS. 3(A)-3(D) illustrate an SSL session creation process according to the present disclosure.
Figure 3:
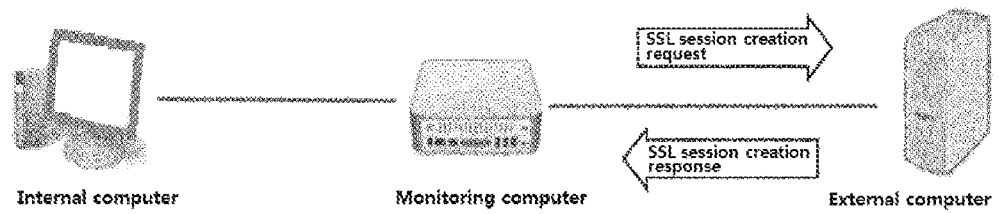
Figure 3:
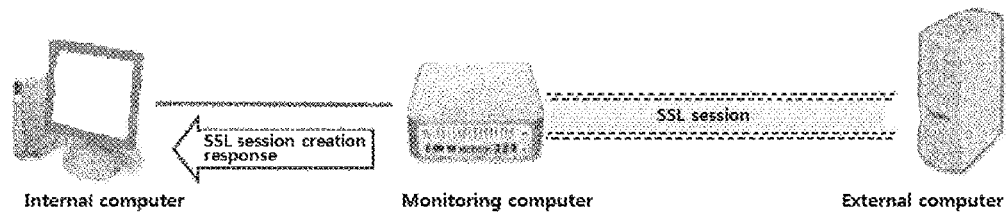
Figure 3:
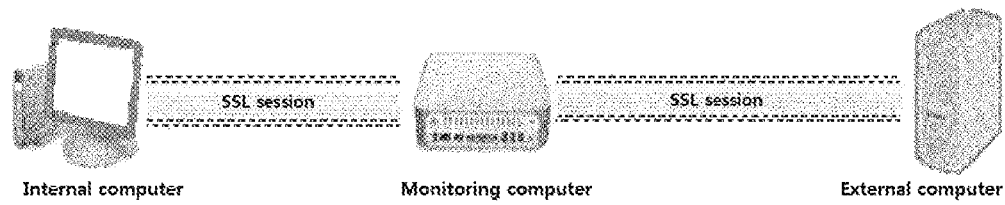

In FIG. 3(A), the monitoring computer receives an SSL session creation request from the internal computer.

In FIG. 3(B), in order to create a new SSL session between the monitoring computer and the external computer, the monitoring computer makes a request for an SSL session to the external computer and receives a response thereto.

In FIG. 3(C), an SSL session is created between the monitoring computer and the external computer, and a response to the SSL session creation request is transmitted to the internal computer.

In FIG. 3(D), an SSL session is created between the monitoring computer and the internal computer.

After the SSL session creation process shown in FIGS. 3(A)-3(D), the internal computer establishes an SSL session with the monitoring computer, instead of the external computer, which is the original target for connection.

In this case, the SSL session between the monitoring computer and the external computer is created using an original certificate transmitted from the external computer, and the SSL session between the monitoring computer and the internal computer is created using a monitoring-computer-modified certificate that is obtained through modification of the original certificate by the monitoring computer.

The original certificate is transmitted by the external computer and has a signature of a certification authority (CA).

In order to create an SSL session between the monitoring computer and the internal computer, a certificate of the external computer and a private key of the external computer, which is symmetric with the public key contained in the certificate of the external computer, are required. Since the private key of the external computer is possessed only by the external computer, the SSL session is established by creating a certificate including a private key, which is randomly created by the monitoring computer, and a public key, which is symmetric with the randomly created private key. In this case, in order to identify the certificate, the content of the existing certificate (original certificate) of the external computer is copied and the public key information of the original certificate is replaced with the randomly created public key.

Therefore, the monitoring computer creates a modified certificate obtained by modifying the original certificate using the randomly created public key (hereinafter, referred to as "monitoring-computer-modified certificate"), and transmits the monitoring-computer-modified certificate to the internal computer.

At this time, the monitoring-computer-modified certificate may also have the signature of a private CA to thus be transmitted, and the reason for using the private CA is as follows.

When an SSL session is created, the internal computer checks the validity of the certificate of the external computer. In this case, the internal computer checks whether or not the entity (URL, domain, etc.) of the certificate of the external computer matches the actually accessed URL and whether or not the certification authority (CA) that issued the certificate is reliable. The identification of the entity can be dealt with in the process of copying the certificate of the external computer, but the reliability of the issuer of the certificate cannot be solved because the modified certificate cannot be verified by the actual certification authority. Therefore, the modified certificate may be verified by any private CA created by the monitoring computer, and the private CA may be registered in the reliable certification authority of the internal computer, thereby overcoming the reliability problem for the modified certificate used in the monitoring computer.

In the present disclosure, an SSL session is created between the internal computer and the monitoring computer using a modified certificate verified by a private CA and a private key. In addition, an encrypted packet is identified through the monitoring computer and the created SSL sessions (the SSL session with the external computer and the SSL session with the internal computer) to thus check whether or not there is a leakage of internal information, and if there is no leakage of internal information, the encrypted packet is transmitted through the SSL session to the original destination.

Therefore, the monitoring computer of the present disclosure makes a request for an SSL session to the external computer after receiving an SSL session creation request from the internal computer, and receives a response thereto, thereby creating an SSL session between the monitoring computer and the external computer. In addition, the monitoring computer transmits a response to the SSL session creation request to the internal computer, thereby creating an SSL session between the monitoring computer and the internal computer. Further, the SSL session between the monitoring computer and the external computer is created using an original certificate transmitted from the external computer, and the SSL session between the monitoring computer and the internal computer is created using a monitoring-computer-modified certificate that is obtained through modification of the original certificate by the monitoring computer.

In addition, when transmitting a packet from the internal computer to the external computer, the monitoring computer checks whether or not the packet contains internal information and then transmits the same. When transmitting a packet from the external computer to the internal computer, the monitoring computer checks whether or not the packet contains a code for leakage of internal information (code inducing leakage of internal information, such as code for displaying an input screen to induce a user to input a personal identification number, which is internal information), and then transmits the same.

The invention claimed is:

1. A system for monitoring leakage of internal information, the system comprising:
    an internal computer;
    a monitoring computer; and
    an external computer,
    wherein the monitoring computer is configured to:
    make a request for an SSL session to the external computer after receiving an SSL session creation request from the internal computer;
    upon receiving a response thereto, create an SSL session between the monitoring computer and the external computer using an original certificate transmitted from the external computer;
    transmit a response to the SSL session creation request to the internal computer to thus create an SSL session between the monitoring computer and the internal computer, wherein the SSL session between the monitoring computer and the internal computer is created using a monitoring-computer-modified certificate that is obtained through modification of the original certificate; and when transmitting a packet from the internal computer to the external computer, check whether or not the packet contains internal information and then transmit the same, wherein the original certificate includes a public key of the external computer, and the monitoring computer is configured to obtain the monitoring-computer-modified certificate by replacing the public key included in the original certificate with a randomly created key.

2. The system of claim 1, wherein the modification of the original certificate is performed by the monitoring computer, and when the monitoring computer checks whether or not the packet contains internal information and then transmits the same, the monitoring computer decrypts the packet using a session key related to the monitoring-computer-modified certificate, checks whether or not the packet contains internal information, then encrypts the decrypted packet using a session key related to the original certificate, and transmits the same to the external computer.

3. The system of claim 1, wherein the monitoring computer comprises a network interface, an ARP spoofing module, an SSL traffic decryption/encryption module, and an SSL session information DB, the network interface is configured to enable the monitoring computer to transmit and/or receive data to and/or from the internal computer and the external computer, the ARP spoofing module is configured to change a route of the packet so as to pass through the monitoring computer, the SSL session information DB is configured to store a session key related to the monitoring-computer-modified certificate and a public key related to the original certificate, and the packet transmitted by the internal computer is decrypted using a session key related to the monitoring-computer-modified certificate, and then the decrypted packet is encrypted using a session key related to the original certificate.

4. The system of claim 1, wherein when transmitting a packet from the external computer to the internal computer, it is checked whether or not the packet transmitted from the external computer contains code for leakage of internal information, and then the packet is transmitted.

5. The system of claim 1, wherein the monitoring computer is configured to create a private certification authority (CA), wherein the created private CA is registered in reliable CA of the internal computer, and the internal computer is configured to check whether the created private CA that issued the monitoring-computer-modified certificate is reliable.

6. A method for monitoring leakage of internal information through analysis of encrypted traffic using a system for monitoring leakage of internal information, which comprises an internal computer, a monitoring computer, and an external computer, the method comprising:

a first step in which the monitoring computer receives an SSL session creation request from the internal computer;

a second step in which, in order to create a new SSL session between the external computer and the monitoring computer, the monitoring computer makes a request for an SSL session to the external computer, and receives a response thereto;

a third step of creating an SSL session between the monitoring computer and the external computer using an original certificate transmitted from the external computer, and then transmitting a response to the SSL session creation request to the internal computer;

a fourth step of creating an SSL session between the monitoring computer and the internal computer using a monitoring-computer-modified certificate obtained through modification of the original certificate; and a fifth step of transmitting a packet from the internal computer to the external computer after the monitoring computer checks whether or not the packet contains internal information, wherein the original certificate includes a public key of the external computer, and the method further comprises obtaining the monitoring-computer-modified certificate by replacing the public key included in the original certificate with a randomly created key.

7. The method of claim 6, wherein, in the fifth step, the monitoring computer decrypts the packet using a session key related to the monitoring-computer-modified certificate, then checks whether or not the packet contains internal information, then encrypts the decrypted packet using a session key related to the original certificate, and then transmits the same to the external computer.

8. The method of claim 6, further comprising:

creating a private certification authority (CA), wherein the created private CA is registered in reliable CA of the internal computer; and checking whether the created private CA that issued the monitoring-computer-modified certificate is reliable.

9. A method, the method comprising:

receiving from an external computer an original certificate, wherein the original certificate includes a public key of the external computer;

creating a first SSL session between a monitoring computer and the external computer using the original certificate;

replacing the public key included in the original certificate with a randomly created key, thereby creating a modified certificate; and creating a second SSL session between the monitoring computer and an internal computer using the modified certificate.

10. The method of claim 9, the method further comprising:

creating a private certification authority (CA), wherein the created private CA is registered in reliable CA of the internal computer; and checking whether the created private CA that issued the modified certificate is reliable.

\* \* \* \* \*